United States Patent
Imaizumi

(10) Patent No.: US 10,067,411 B2
(45) Date of Patent: Sep. 4, 2018

(54) DRIVING APPARATUS APPROPRIATE FOR DRIVING MIRROR UNIT AND IMAGE PICKUP APPARATUS

(71) Applicant: CANON KABUSHIKI KAISHA, Tokyo (JP)

(72) Inventor: Takuya Imaizumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 15/496,648

(22) Filed: Apr. 25, 2017

(65) Prior Publication Data

US 2017/0315429 A1    Nov. 2, 2017

(30) Foreign Application Priority Data

Apr. 28, 2016   (JP) .................................. 2016-090975

(51) Int. Cl.

| | |
|---|---|
| *G03B 19/12* | (2006.01) |
| *G02B 26/08* | (2006.01) |
| *G03B 13/08* | (2006.01) |
| *G03B 9/32* | (2006.01) |
| *G03B 9/08* | (2006.01) |
| *G03B 17/42* | (2006.01) |

(52) U.S. Cl.

CPC ......... *G03B 19/12* (2013.01); *G02B 26/0816* (2013.01); *G03B 13/08* (2013.01); *G03B 9/08* (2013.01); *G03B 9/32* (2013.01); *G03B 17/425* (2013.01)

(58) Field of Classification Search

CPC ...................................................... G03B 19/12

USPC ......................................................... 396/358
See application file for complete search history.

(56) References Cited

U.S. PATENT DOCUMENTS

| | | | | |
|---|---|---|---|---|
| 3,003,366 | A | * 10/1961 | Herbst ................... | D05B 19/00 |
| | | | | 112/459 |
| 4,673,278 | A | * 6/1987 | Fukuda .................. | G03B 19/12 |
| | | | | 396/272 |
| 4,945,379 | A | * 7/1990 | Date ...................... | G03B 7/081 |
| | | | | 348/341 |
| 5,864,725 | A | * 1/1999 | Ogi ........................ | G03B 19/12 |
| | | | | 396/358 |

(Continued)

FOREIGN PATENT DOCUMENTS

| | | | | |
|---|---|---|---|---|
| JP | H07168280 | * | 4/1995 | ............. G03B 19/12 |
| JP | 07-168280 A | | 7/1995 | |

(Continued)

*Primary Examiner* — Clayton E Laballe
*Assistant Examiner* — Kevin Butler
(74) *Attorney, Agent, or Firm* — Cowan, Liebowitz & Latman, P.C.

(57) ABSTRACT

A driving apparatus which is capable of smoothly moving a follower by a cam portion, and realizes the stopper structure of the follower by a small number of components without the size increased. The driving apparatus comprises an up cam gear having an up radial cam and an up thrust cam, and a down cam gear unit having a down radial cam and a down thrust cam. The up cam gear and the down cam gear unit mesh with each other in a vicinity of a region in which a lift amount of the up radial cam with respect to the follower increases. In a vicinity of a position at which the up cam gear and the down cam gear unit mesh with each other, a lift amount of the up thrust cam is larger than a lift amount of the down thrust cam in the thrust direction.

7 Claims, 6 Drawing Sheets

(56) References Cited

U.S. PATENT DOCUMENTS

| | | | | |
|---|---|---|---|---|
| 5,875,724 A * | 3/1999 | Ito | D05B 3/06 | 112/316 |
| 5,878,296 A * | 3/1999 | Ogi | G03B 17/425 | 396/358 |
| 5,892,990 A * | 4/1999 | Ogi | G03B 19/12 | 396/358 |
| 6,086,503 A * | 7/2000 | Konishi | G03B 17/02 | 475/14 |
| 6,131,545 A * | 10/2000 | Kreuter | F01L 13/0005 | 123/198 F |
| 2004/0062540 A1* | 4/2004 | Misawa | G03B 17/425 | 396/387 |
| 2010/0054727 A1* | 3/2010 | Okutani | G03B 9/42 | 396/466 |
| 2010/0290775 A1* | 11/2010 | Misawa | G03B 19/12 | 396/358 |
| 2010/0290776 A1* | 11/2010 | Misawa | G03B 9/08 | 396/358 |
| 2010/0321556 A1* | 12/2010 | Misawa | G03B 9/02 | 348/341 |
| 2011/0132304 A1* | 6/2011 | Katayama | F01L 1/053 | 123/90.44 |
| 2013/0202283 A1* | 8/2013 | Yamana | G03B 19/12 | 396/358 |
| 2013/0202284 A1* | 8/2013 | Yamana | G03B 19/12 | 396/358 |
| 2013/0209084 A1* | 8/2013 | Yamana | G03B 19/12 | 396/358 |
| 2015/0037023 A1* | 2/2015 | Sanada | H02K 7/075 | 396/358 |
| 2016/0054542 A1* | 2/2016 | Yamana | G02B 7/1821 | 359/874 |
| 2017/0315429 A1* | 11/2017 | Imaizumi | G02B 26/0816 | |

FOREIGN PATENT DOCUMENTS

| | | | | |
|---|---|---|---|---|
| JP | H07168280 | * | 7/1995 | G03B 19/12 |
| JP | 2007-327503 A | | 12/2007 | |
| JP | 2007327503 | * | 12/2007 | G03B 19/12 |

* cited by examiner

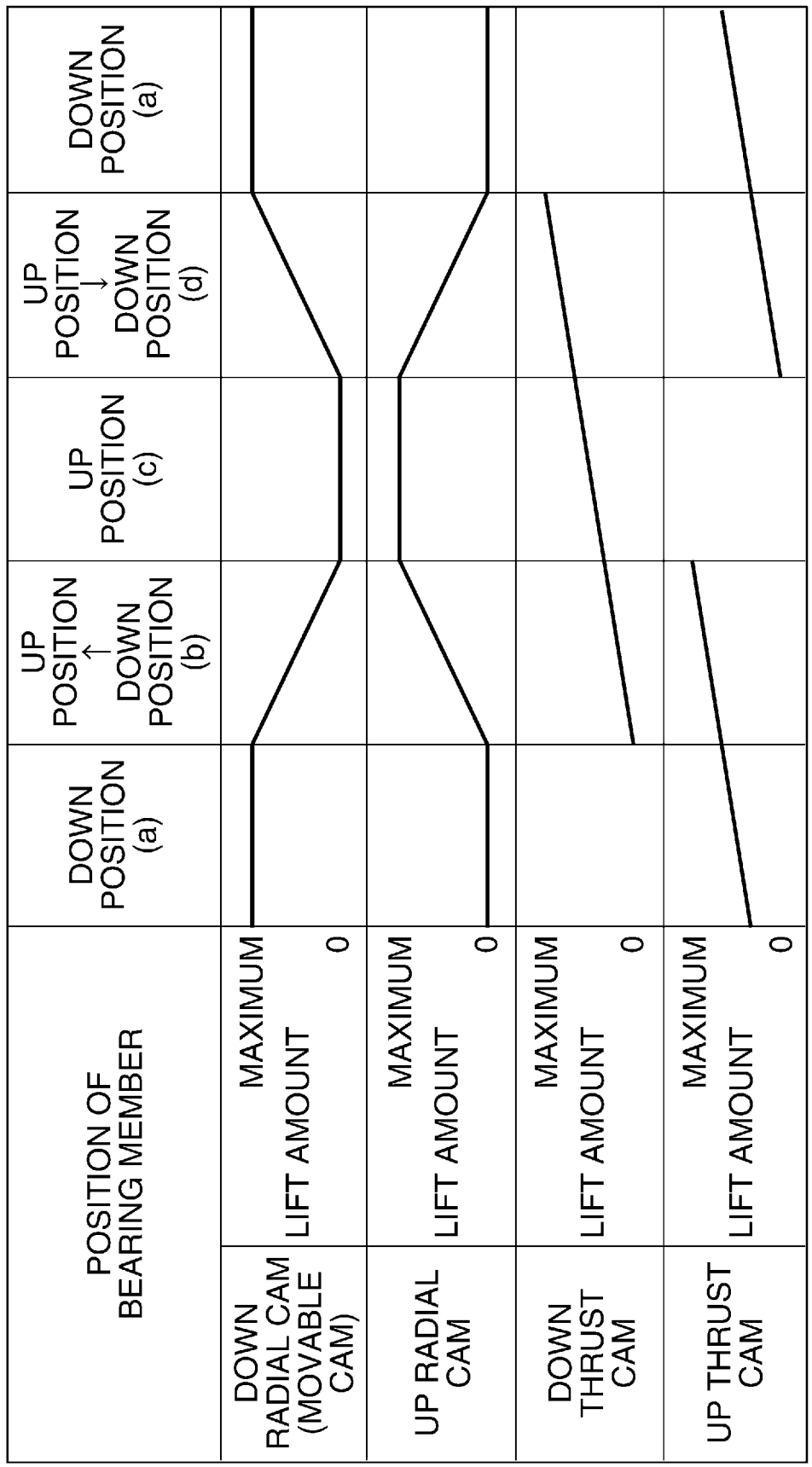

DRIVING APPARATUS APPROPRIATE FOR DRIVING MIRROR UNIT AND IMAGE PICKUP APPARATUS

BACKGROUND OF THE INVENTION

Field of the Invention

The present invention relates to, for example, a driving apparatus for driving a mirror unit of an image pickup apparatus such as a single-lens reflex camera.

Description of the Related Art

As a device to drive a mirror unit of a single-lens reflex camera and the like, a device is proposed in which a lever is reciprocally driven by two cam gears meshing with each other. In this proposal, a driving shaft of the lever is supported by a bearing member that is engaged with each of two cam gears such that the driving shaft can be inserted into and drawn out of the bearing member; and the bearing member overlaps the two cam gears, when viewed from the shaft direction in the entire operation range of the lever, so as to prevent the bearing member from dropping out (Japanese Laid-Open Patent Publication (kokai) No. H07-168280). In addition, a technique of introducing a stopper ring mounted as a drop-out stopper of the bearing member onto a construction in which a bearing member rotatably supported by an arm is engaged with a cam, is proposed (Japanese Laid-Open Patent Publication (kokai) No. 2007-327503).

However, in Japanese Laid-Open Patent Publication (kokai) No. H07-168280 mentioned above, when the operation angle of the lever becomes large, it is difficult for the bearing member to overlap the two cam gears in the shaft direction at all times. Accordingly, there is a possibility that the bearing member is caught by a difference in level between the two cam gears and the operation of the lever is thus disturbed.

In the case of the technique in Japanese Laid-Open Patent Publication (kokai) No. 2007-327503 mentioned above, a stopper ring is used as a drop-out stopper of the bearing member, which increases the number of components and the size in the shaft direction.

SUMMARY OF THE INVENTION

An object of the present invention is to provide a driving apparatus in which a cam portion secures a smooth movement of a follower to be driven in a radial direction and in which the stopper structure of the follower is realized by a small number of components without the size increased.

Accordingly, a first aspect of the present invention provides a driving apparatus comprising a first gear having a first cam portion configured to act on a follower in a radial direction, and a second cam portion configured to act on the follower in a thrust direction, and a second gear having a third cam portion configured to act on the follower in a radial direction, and a fourth cam portion configured to act on the follower in the thrust direction, the second gear meshing with the first gear, wherein the first gear and the second gear mesh with each other in a vicinity of a first region in which a lift amount of the first cam portion, with respect to the follower in a radial direction from the first gear toward the second gear, increases, and in a vicinity of a position at which the first gear and the second gear mesh with each other in the vicinity of the first region, a lift amount of the second cam portion in the thrust direction is larger than a lift amount of the fourth cam portion in the thrust direction.

Accordingly, a second aspect of the present invention provides another driving apparatus comprising a first gear having a first cam portion configured to act on a follower in a radial direction and a second cam portion configured to act on the follower in a thrust direction, and a second gear having a third cam portion configured to act on the follower in a radial direction and a fourth cam portion configured to act on the follower in the thrust direction, the second gear meshing with the first gear, wherein, when the follower moves from a position at which the follower overlaps the second cam portion when viewed from the thrust direction to a position at which the follower overlaps the fourth cam portion when viewed from the thrust direction, a lift amount of the second cam portion in the thrust direction is larger than a lift amount of the fourth cam portion in the thrust direction.

According to the present invention, a smooth movement of the follower driven in the radial direction by the cam portions, is secured, and in addition, the stopper structure of the follower is realized by a small number of components without the size increased.

Further features of the present invention will become apparent from the following description of exemplary embodiments (with reference to the attached drawings).

BRIEF DESCRIPTION OF THE DRAWINGS

FIG. 4 is a diagram for explaining behaviors of the respective cams corresponding to the positions (a) to (d) of the bearing member when a mirror holder reciprocates between a mirror up position and a mirror down position.

DESCRIPTION OF THE EMBODIMENTS

The present invention will now be described in detail below with reference to the accompanying drawings showing embodiments thereof.

Figure 1A:
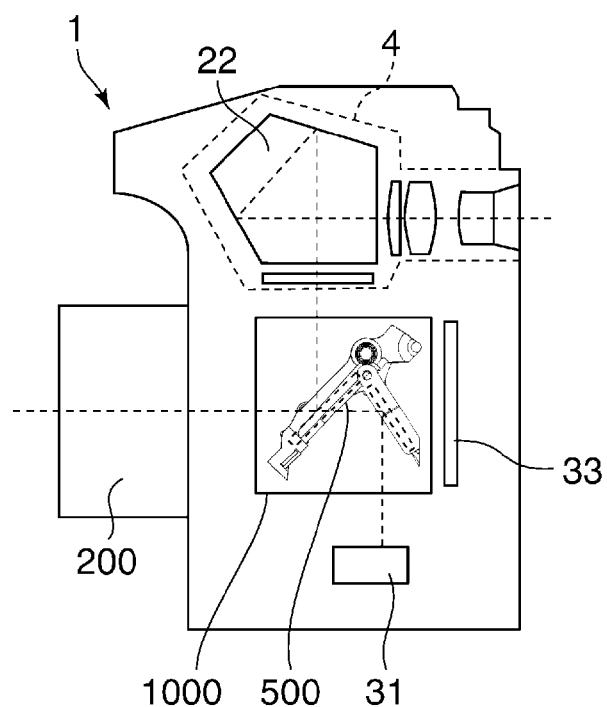
FIGS. 1A and 1B are schematic diagrams each showing a configuration of a digital single-lens reflex camera equipped with a mirror driving apparatus, which is an example of an embodiment of a driving apparatus of the present invention.
Figure 1B:
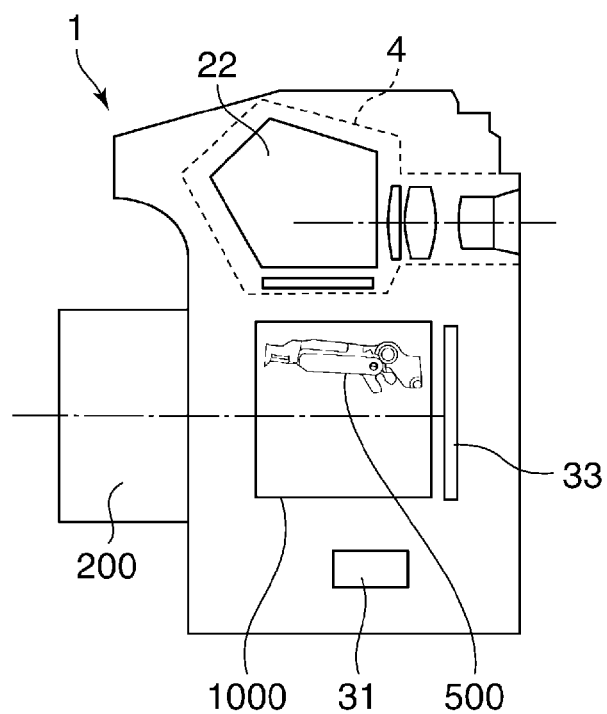

FIGS. 1A and 1B are schematic diagrams each showing a configuration of a digital single-lens reflex camera equipped with a mirror driving apparatus, which is an example of an embodiment of a driving apparatus of the present invention. It should be noted that, in the present embodiment, a digital single-lens reflex camera is exemplified as an image pickup apparatus, an image pickup apparatus of the present invention is not limited to this example.

A digital single-lens reflex camera of the present embodiment has an interchangeable lens 200 detachably mounted on a front side of a camera body 1 as shown in FIGS. 1A and 1B. The camera body 1 comprises a focus detection unit 31, a finder optical system 4, a mirror driving unit 1000, and an imaging sensor 33 inside thereof. The mirror driving unit 1000 causes a mirror holder 502 of a mirror unit 500, which is an example of a driven body of the present invention, to reciprocate between a mirror down position at which the mirror unit 500 moves into a photographing optical path (see FIG. 1A) and a mirror up position at which the mirror unit 500 retracts from the photographing optical path (see FIG. 1B).

When the mirror unit 500 is at the mirror down position as shown in FIG. 1A, a luminous flux from an object passing through the interchangeable lens 200 is reflected by the mirror unit 500 and is guided to a pentaprism 22 of the finder optical system 4, and it is thus possible to observe the object from the finder. On the other hand, when the mirror unit 500 is at the mirror up position as shown in FIG. 1B, the luminous flux passing through the interchangeable lens 200 is not guided to the finder optical system 4 but guided to the imaging sensor 33 to form an image, the luminous flux is then photoelectric-converted into an image signal, and the image signal is output to an image processing unit (not shown).

Figure 2:
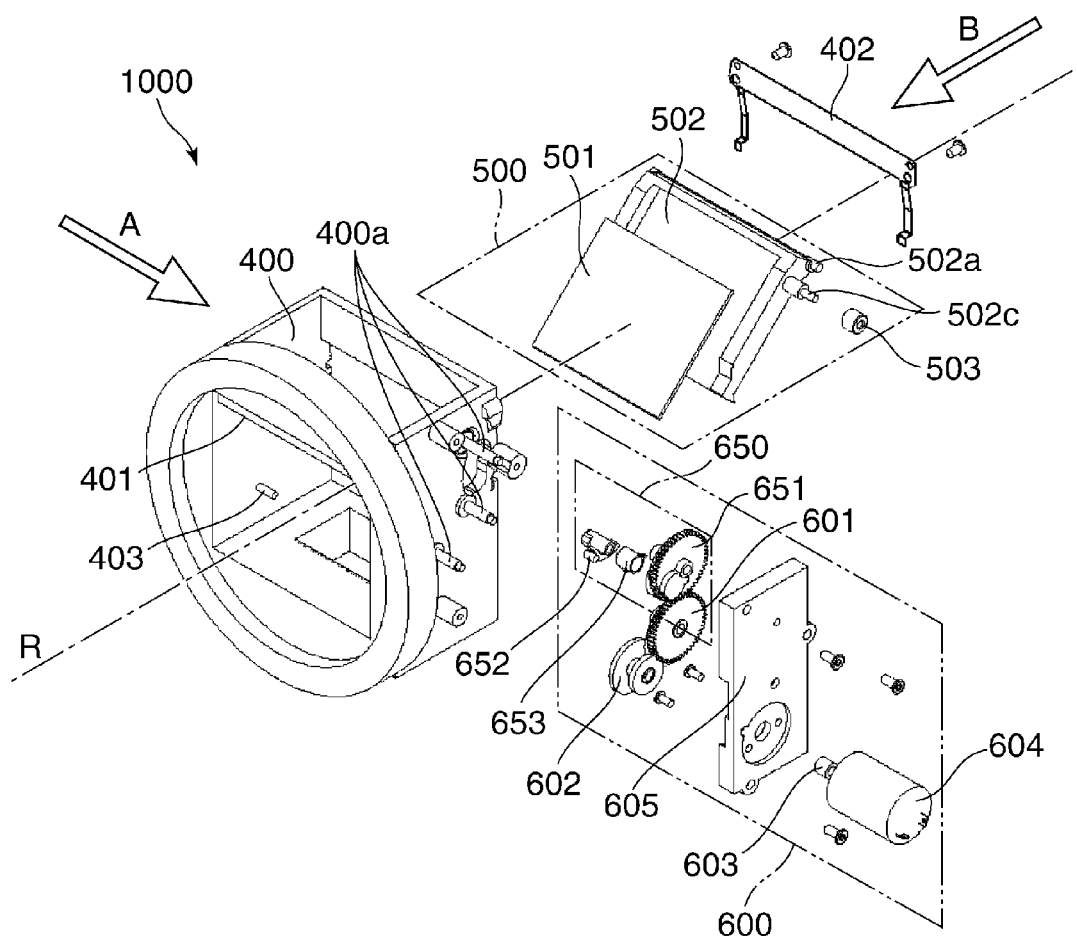
FIG. 2 is an exploded perspective view showing a configuration of a mirror driving unit.

FIG. 2 is an exploded perspective view showing a configuration of the mirror driving unit 1000. As shown in FIG. 2, the mirror driving unit 1000 comprises a mirror box 400, the mirror unit 500, and a mirror driving apparatus 600 (hereinafter, referred to as a driving apparatus 600).

The mirror unit 500 has the mirror holder 502 to hold a mirror 501. The mirror holder 502 is provided with a rotation shaft 502a and a driving shaft 502c thereon. The mirror holder 502 is fixed to the mirror box 400 so as to rotate around the rotation shaft 502a, between the mirror down position and the mirror up position. The mirror box 400 has a shaft pressing plate 402 attached to a back surface thereof.

The shaft pressing plate 402 is attached to the mirror box 400 in a state that the mirror holder 502 is attached to the mirror box 400, and to thereby press the rotation shaft 502a of the mirror holder 502. With this arrangement, the mirror holder 502 is rotatably supported with respect to the mirror box 400. On a tip of the driving shaft 502c, a bearing member 503 is held such that the bearing member 503 can be inserted into and drawn out in the shaft direction. The bearing member 503 corresponds to an example of a follower of the present invention.

The mirror box 400 is provided with a positioning shaft 403 on one side thereof. The mirror holder 502 comes into contact with the positioning shaft 403 and is thus positioned at the mirror down position. Further, the mirror box 400 is provided with a mirror-up stopper 401. The mirror holder 502 is positioned at the mirror up position by a tip of the mirror holder 502 coming into contact with the mirror-up stopper 401. The mirror-up stopper 401 is made of elastic material and absorbs an impact caused when the tip of the mirror holder 502 comes into contact with the mirror-up stopper 401.

Further, the mirror box 400 is provided with the driving apparatus 600 disposed on the other side thereof. The driving apparatus 600 comprises an up cam gear 601, a down cam gear unit 650, a reduction gear 602, a pinion 603, a motor 604, and a motor base 605. The up cam gear 601 corresponds to an example of a first gear of the present invention, and the down cam gear unit 650 corresponds to an example of a second gear of the present invention.

Each of the down cam gear unit 650, the up cam gear 601, and the reduction gear 602 is rotatably supported around each of rotation shafts 400a extending from the mirror box 400. The pinion 603 is fixed to an output shaft of the motor 604. The motor 604 is supported by the motor base 605, and the motor base 605 is attached to the other side of the mirror box 400 with bolts or the like.

The down cam gear unit 650 meshes with the up cam gear 601, the up cam gear 601 meshes with the reduction gear 602, and the reduction gear 602 meshes with the pinion 603.

The down cam gear unit 650 and the up cam gear 601 have the same number of gear teeth; accordingly, the down cam gear unit 650 and the up cam gear 601 rotate while the rotation phases thereof synchronized with each other. That is to say, when a voltage is applied to drive the motor 604, the down cam gear unit 650 and the up cam gear 601 rotate at the same rotation speed.

Figure 3A:
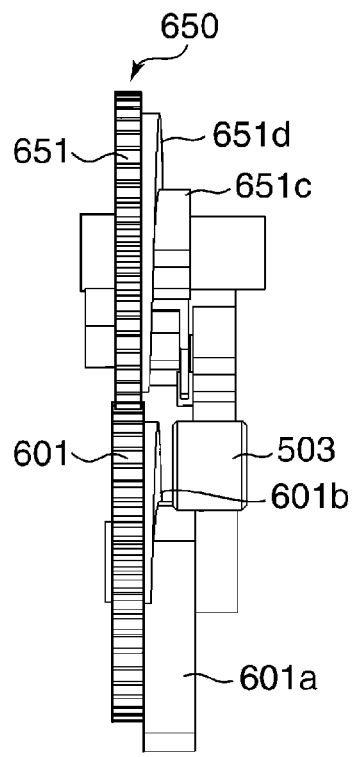
FIGS. 3A to 3C are diagrams each showing detail of a down cam gear unit, an up cam gear, and a bearing member.
Figure 3B:
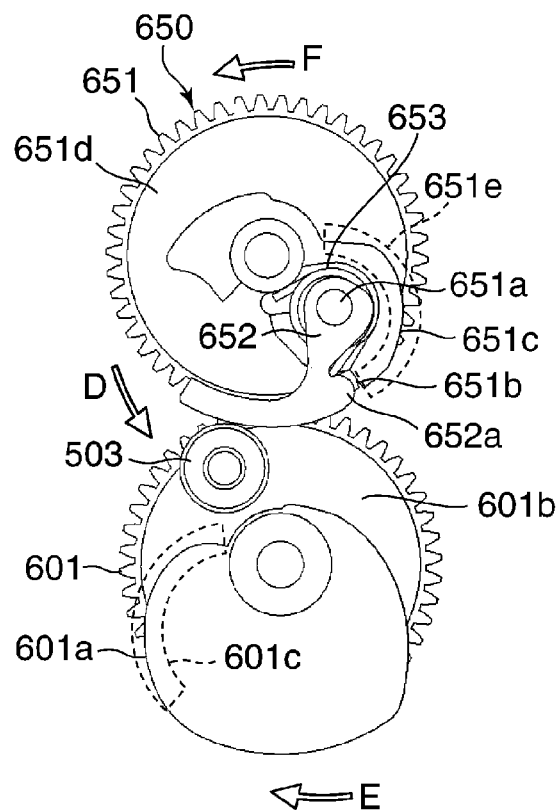
Figure 3C:
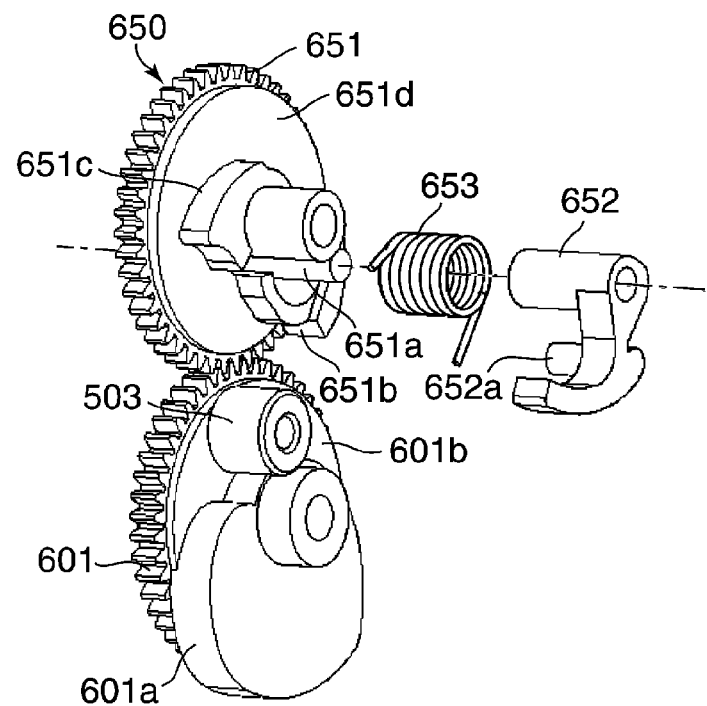

FIGS. 3A to 3C are diagrams each showing detail of the down cam gear unit, the up cam gear, and the bearing member. FIG. 3A is an enlarged view of the down cam gear unit 650, the up cam gear 601, and the bearing member 503, viewed from the arrow B direction in FIG. 2, and FIG. 3B is an enlarged view of the down cam gear unit 650, the up cam gear 601, and the bearing member 503, viewed from the arrow A direction in FIG. 2. FIG. 3C is a partially exploded perspective view of FIG. 3B.

As shown in FIGS. 3A to 3C, the down cam gear unit 650 comprises a down cam gear 651, a movable cam 652, and a urging spring 653. The movable cam 652 is rotatably supported with respect to a rotation shaft 651a extending from the down cam gear 651. The urging spring 653 is disposed between the down cam gear 651 and the movable cam 652, and urges the movable cam 652 toward the down cam gear 651, in the arrow D direction in FIG. 3B.

The movable cam 652 has a stopper pin 652a, wherein the stopper pin 652a comes into contact with a stopper 651b provided on the down cam gear 651 and stops the movable cam 652. At this time, the movable cam 652 urges the bearing member 503, and to thereby urge the mirror holder 502 toward the mirror down position. Consequently, the mirror holder 502 is positioned at the mirror down position.

The up cam gear 601 has an up radial cam 601a, which drives the bearing member 503, and an up thrust cam 601b, which comes into contact with the bearing member 503 when the bearing member 503 moves in the arrow A direction (thrust direction) in FIG. 2. The down cam gear 651 has a down radial cam 651c, which drives the bearing member 503, and a down thrust cam 651d, which comes into contact with the bearing member 503 when the bearing member 503 moves in the arrow A direction in FIG. 2. The bearing member 503 is driven by the up radial cam 601a and the down radial cam 651c to drive, which causes the mirror holder 502 to reciprocate between the mirror up position and the mirror down position.

Here, the up radial cam 601a corresponds to an example of a first cam portion of the present invention, and the up thrust cam 601b corresponds to an example of a second cam portion of the present invention. The down radial cam 651c corresponds to an example of a third cam portion of the present invention, and the down thrust cam 651d corresponds to an example of a fourth cam portion of the present invention.

Regarding the up radial cam 601a, a first region 601c surrounded by the broken line shown in FIG. 3B is an area in which the lift amount is increased to apply a driving force to the bearing member 503. Further, regarding the down radial cam 651c, a second region 651e surrounded by the broken line is an area in which the lift amount is increased to apply a driving force to the bearing member 503.

Next, an operation of the mirror driving unit 1000 will be described with reference to FIG. 4 and FIGS. 5A to 5H. FIG. 4 is a diagram for explaining behaviors of the respective cams 651c, 601a, 651d, and 601b corresponding to the positions (a) to (d) of the bearing member 503 when the mirror holder 502 reciprocates between the mirror up position and the mirror down position. It should be noted that, since the movable cam 652 also acts on the bearing member 503 to drive the mirror holder 502, similarly to the down radial cam 651c, the movable cam 652 is put together with the down radial cam 651c in FIG. 4.

FIGS. 5A, 5C, 5E, and 5G are diagrams showing the states of the down cam gear unit 650, the up cam gear 601, and the bearing member 503 viewed from the arrow A direction in FIG. 2, respectively when the bearing member 503 is at the positions (a) to (d) shown in FIG. 4. FIGS. 5B, 5D, 5F, and 5H are diagrams showing the states of the down cam gear unit 650, the up cam gear 601, and the bearing member 503 viewed from the arrow B direction in FIG. 2, respectively when the bearing member 503 is at the positions (a) to (d) shown in FIG. 4.

With reference to FIG. 4, the up thrust cam 601b has a sloping cam shape. In the sloping cam shape, the lift amount of the forward direction side in the rotational direction of the up cam gear 601 is large, and the lift amount of the backward direction side in the rotational direction of the up cam gear 601 is small, with respect to the position at which the lift amount of the up radial cam 601a is the largest. The down thrust cam 651d has a sloping cam shape. In the sloping cam shape, the lift amount of the forward direction side in the rotational direction of the down cam gear 651 is large, and the lift amount of the backward direction side in the rotational direction of the down cam gear 651 is small, with respect to the position at which the lift amount of the down radial cam 651c is the largest.

Figure 5A:
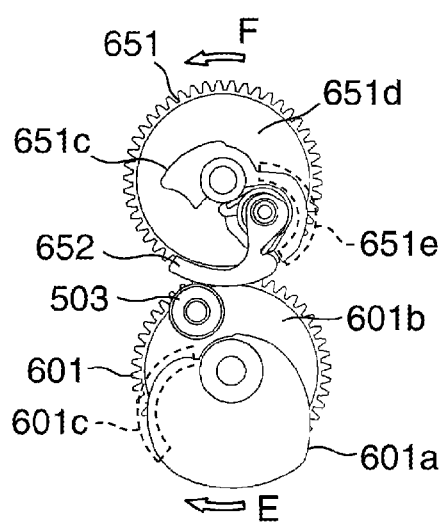
FIGS. 5A to 5H are diagrams each showing the states of the down cam gear unit, the up cam gear, and the bearing member, the diagrams corresponding to the positions (a) to (d) of the bearing member in FIG. 4.
Figure 5C:
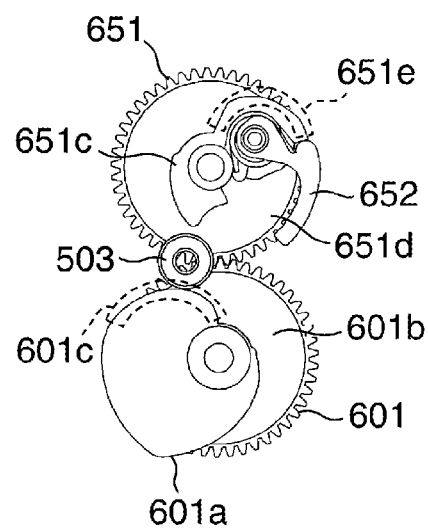
Figure 5B:
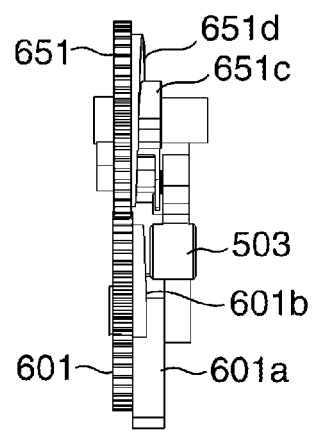

When the bearing member 503 is at position (a), the mirror holder 502 is at the mirror down position, which corresponds to the state of FIG. 5A and FIG. 5B. In this state, the movable cam 652 of the down cam gear unit 650 contacts with the bearing member 503, and thus holds the mirror holder 502 at the mirror down position.

In this state, the bearing member 503 is located at the position at which the bearing member 503 overlaps the up thrust cam 601b when viewed from the arrow A direction in FIG. 2. Then, when a voltage is applied to the motor 604, an output of the motor 604 is transferred to the up cam gear 601, through the pinion 603 and the reduction gear 602. Consequently, the up cam gear 601 rotates in the arrow E direction in FIG. 5A, which causes the down cam gear unit 650 to rotate in the arrow F direction in FIG. 5A.

Figure 5D:
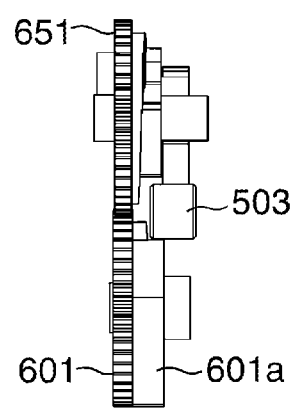
Figure 5E:
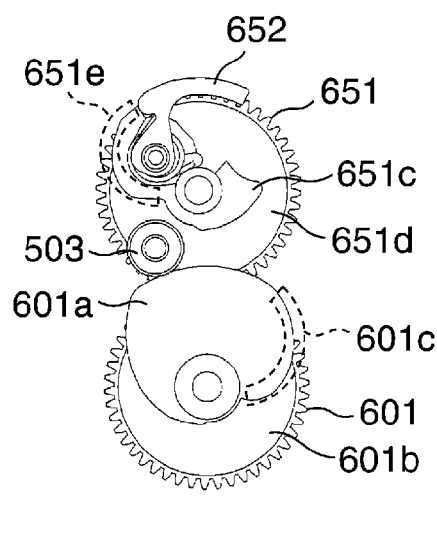
Figure 5G:
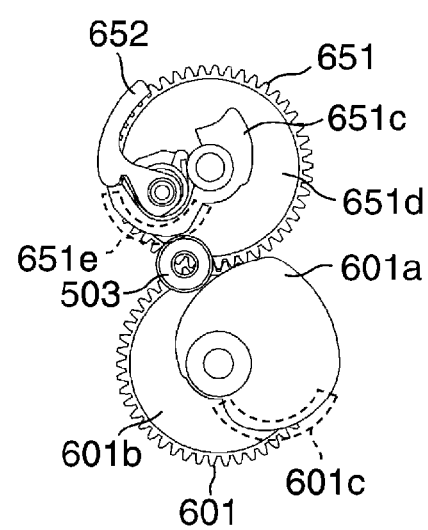
Figure 5F:
Figure 5H:

When the down cam gear unit 650 rotates in the arrow F direction, the bearing member 503 moves away from the movable cam 652, comes into contact with the up radial cam 601a, and moves toward the mirror up position (position (b) in FIG. 4, and FIGS. 5C and 5D). In this state, the up cam gear 601 and the down cam gear 651 mesh with each other in the vicinity of the first region 601c of the up radial cam 601a. Then, the bearing member 503 moves from the position, at which the bearing member 503 overlaps the up thrust cam 601b when viewed from the arrow A direction in FIG. 2, toward the position, at which the bearing member 503 overlaps the down thrust cam 651d when viewed form the arrow A direction in FIG. 2.

At this time, the up thrust cam 601b is at the position, at which the up thrust cam 601b is larger in lift amount than the down thrust cam 651d, and a difference in level is formed between the cams 601b and 651d. Further, the down thrust cam 651d is located farther from the bearing member 503 than the up thrust cam 601b is. Therefore, even when the bearing member 503 moves in the direction (shaft direction), in which the bearing member 503 drops out of the driving shaft 502c, and is in contact with the up thrust cam 601b, a difference in level between the cams 601b and 651d enables the bearing member 503 to smoothly move without being caught by something nor stopped in the middle of the way.

When the voltage further continues to be applied to the motor 604, the mirror holder 502 comes into contact with the mirror-up stopper 401 and the motor 604 stops driving. At this time, after the mirror holder 502 comes into contact with the mirror-up stopper 401, the motor 604 is short-braked, and the mirror unit 500 stops at the mirror up position (position (c) in FIG. 4, and FIGS. 5E and 5F). When the mirror unit 500 is at the mirror up position, the luminous flux passing through the interchangeable lens 200 is guided to the imaging sensor 33, and an imaging operation is performed. In this state, the bearing member 503 is located at the position at which the bearing member 503 overlaps the down thrust cam 651d when viewed from the arrow A direction in FIG. 2.

When a voltage is applied to the motor 604 after the imaging is completed, the up cam gear 601 rotates in the arrow E direction in FIG. 5A, and at the same time, the down cam gear unit 650 rotates in the arrow F direction in FIG. 5A. When the up cam gear 601 continues to rotate in the arrow E direction, the bearing member 503 moves away from the up radial cam 601a, comes into contact with the down radial cam 651c, and is driven toward the mirror down position (position (d) in FIG. 4, and FIGS. 5G and 5H). In this state, the up cam gear 601 and the down cam gear 651 mesh with each other in the vicinity of the second region 651e of the down radial cam 651c. Then, the bearing member 503 moves from the position, at which the bearing member 503 overlaps the down thrust cam 651d when viewed from the arrow A direction in FIG. 2, toward the position, at which the bearing member 503 overlaps the up thrust cam 601b when viewed from the arrow A direction in FIG. 2.

At this time, the down thrust cam 651d is located at the position, at which the down thrust cam 651d is larger in lift amount than the up thrust cam 601b, and a difference in level is formed between the cams 651d and 601b. Further, the up thrust cam 601b is located farther from the bearing member 503 than the down thrust cam 651d is. Therefore, even when the bearing member 503 moves in the direction, in which the bearing member 503 drops out of the driving shaft 502c, and is in contact with the down thrust cam 651d, a difference in level between the cams 651d and 601b enables the bearing member 503 to smoothly move without being caught by something nor stopped in the middle of the way.

When the voltage further continues to be applied to the motor 604, the bearing member 503 comes into contact with the movable cam 652, the mirror holder 502 comes into contact with the positioning shaft 403, and the motor 604 stops driving. After the mirror holder 502 comes into contact with the positioning shaft 403, the motor 604 is short-braked, and the mirror unit 500 stops at the mirror down position (position (a) in FIG. 4, and FIGS. 5A and 5B).

As described above, in the present embodiment, in the down cam gear unit 650, the thrust cam 651d and the radial cam 651c for the downward direction are formed on the down cam gear 651, and the thrust cam 601b and the radial cam 601a for the upward direction are formed on the up cam gear 601. Further, the thrust cam 651d of the down cam gear unit 650 and the thrust cam 601b of the up cam gear 601 prevents the bearing member 503 from dropping out. This arrangement makes it possible to secure a smooth movement of the bearing member 503 driven in the radial direction by the radial cams 601a and 651c and to realize a stopper structure of the bearing member 503 with a small number of components without the size increased.

It should be noted that a configuration of the present invention is not limited to the configuration exemplified in the above embodiment and it is possible to appropriately change materials, shapes, dimensions, aspects, numbers, arrangement places and the like, as long as the change does not deviate from the gist of the present invention.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-090975, filed Apr. 28, 2016 which is hereby incorporated by reference wherein in its entirety.

What is claimed is:

1. A driving apparatus comprising:
   a first gear having a first cam portion configured to act on a follower in a radial direction, and a second cam portion configured to act on the follower in a thrust direction; and
   a second gear having a third cam portion configured to act on the follower in a radial direction, and a fourth cam portion configured to act on the follower in the thrust direction, the second gear meshing with the first gear,
   wherein the first gear and the second gear mesh with each other in a vicinity of a first region in which a lift amount of the first cam portion, with respect to the follower in a radial direction from the first gear toward the second gear, increases, and
   in a vicinity of a position at which the first gear and the second gear mesh with each other in the vicinity of the first region, a lift amount of the second cam portion in the thrust direction is larger than a lift amount of the fourth cam portion in the thrust direction.

2. The driving apparatus according to claim 1, wherein the first gear and the second gear mesh with each other in a vicinity of a second region, in which a lift amount of the third cam portion, with respect to the follower in a radial direction from the second gear toward the first gear, increases, and
   in a vicinity of a position at which the first gear and the second gear mesh with each other in a vicinity of the second region, the lift amount of the second cam portion is smaller than the lift amount of the fourth cam portion.

3. A driving apparatus comprising:
   a first gear having a first cam portion configured to act on a follower in a radial direction and a second cam portion configured to act on the follower in a thrust direction; and
   a second gear having a third cam portion configured to act on the follower in a radial direction and a fourth cam portion configured to act on the follower in the thrust direction, the second gear meshing with the first gear,
   wherein, when the follower moves from a position at which the follower overlaps the second cam portion when viewed from the thrust direction to a position at which the follower overlaps the fourth cam portion when viewed from the thrust direction, a lift amount of the second cam portion in the thrust direction is larger than a lift amount of the fourth cam portion in the thrust direction.

4. The driving apparatus according to claim 3, wherein, when the follower moves from a position at which the follower overlaps the fourth cam portion when viewed from the thrust direction to a position at which the follower overlaps the second cam portion when viewed from the thrust direction, the lift amount of the second cam portion in the thrust direction is smaller than the lift amount of the fourth cam portion in the thrust direction.

5. The driving apparatus according to claim 1, wherein the follower is a bearing member which is held on a driving shaft of a driven body while being capable of being inserted into and drawn out in the thrust direction.

6. The driving apparatus according to claim 5, wherein the driven body is a mirror unit that is provided on an image pickup apparatus and is configured to reciprocate between a mirror down position and a mirror up position, wherein at the mirror down position, the mirror unit moves into a photographing optical path to guide a luminous flux of an object to a finder optical system, and at the mirror up position, the mirror unit retracts from the photographing optical path to guide the luminous flux to an image pickup unit.

7. An image pickup apparatus having a mirror driving apparatus, the mirror driving apparatus causing a mirror unit to reciprocate between a mirror down position and a mirror up position, wherein at the mirror down position, the mirror unit moves into a photographing optical path to guide a luminous flux of an object to a finder optical system, and at the mirror up position, the mirror unit retracts from the photographing optical path to guide the luminous flux to an image pickup unit,
   wherein the mirror driving apparatus comprises:
   a first gear having a first cam portion configured to act on a follower in a radial direction and a second cam portion configured to act on the follower in a thrust direction; and
   a second gear having a third cam portion configured to act on the follower in a radial direction and a fourth cam portion configured to act on the follower in the thrust direction, the second gear meshing with the first gear, wherein the first gear and the second gear mesh with each other in a vicinity of a first region in which a lift amount of the first cam portion, with respect to the follower in a radial direction from the first gear toward the second gear, increases, and
in a vicinity of a position at which the first gear and the second gear mesh with each other in the vicinity of the first region, a lift amount of the second cam portion in the thrust direction is larger than a lift amount of the fourth cam portion in the thrust direction.

* * * * *